(12) United States Patent
Gilbreth et al.

(10) Patent No.: US 6,713,892 B2
(45) Date of Patent: Mar. 30, 2004

(54) AUTOMATIC TURBOGENERATOR RESTARTING SYSTEM

(75) Inventors: Mark G. Gilbreth, Woodland Hills, CA (US); Simon R. Wall, Thousand Oaks, CA (US); Ake N. C. Almgren, Calabasas, CA (US); Joel B. Wacknov, Thousand Oaks, CA (US)

(73) Assignee: Capstone Turbine Corporation, Chatsworth, CA (US)

( * ) Notice: Subject to any disclaimer, the term of this patent is extended or adjusted under 35 U.S.C. 154(b) by 0 days.

(21) Appl. No.: 09/900,635

(22) Filed: Jul. 6, 2001

(65) Prior Publication Data

US 2002/0005643 A1 Jan. 17, 2002

Related U.S. Application Data

(62) Division of application No. 09/444,487, filed on Nov. 19, 1999, now Pat. No. 6,281,596.

(51) Int. Cl.[7] .................................................. F02N 11/00
(52) U.S. Cl. ......................................... 290/52; 290/40 C
(58) Field of Search ............................... 290/52, 40 R, 290/40 C; 322/20; 123/299

(56) References Cited

U.S. PATENT DOCUMENTS

| | | | | |
|---|---|---|---|---|
| 2,256,938 A | * | 9/1941 | Charbonneaux | 290/30 R |
| 2,427,462 A | * | 9/1947 | Kaelin | 290/30 R |
| 2,603,756 A | * | 7/1952 | Puttick | 290/30 R |
| 2,697,174 A | * | 12/1954 | Stivender | 123/198 R |
| 2,810,079 A | * | 10/1957 | McFarland | 219/133 |
| 2,818,512 A | * | 12/1957 | McFarland | 290/30 R |
| 2,916,634 A | * | 12/1959 | McFarland | 290/30 R |
| 3,300,647 A | * | 1/1967 | Gogia et al. | 290/30 R |
| 3,456,120 A | * | 7/1969 | Martin | 290/31 |
| 3,526,778 A | * | 9/1970 | Crocker et al. | 290/30 R |
| 3,678,284 A | * | 7/1972 | Peters | 290/1 R |
| 4,352,025 A | * | 9/1982 | Troyen | 290/54 |
| 4,496,845 A | * | 1/1985 | Ensign et al. | 290/43 |
| 5,381,081 A | * | 1/1995 | Radun | 318/696 |
| 5,561,330 A | * | 10/1996 | Crook | 290/30 R |
| 5,647,317 A | * | 7/1997 | Weisman et al. | 123/299 |
| 5,791,868 A | | 8/1998 | Bosley et al. | 415/104 |
| 5,886,504 A | * | 3/1999 | Scott et al. | 322/15 |
| 5,903,116 A | | 5/1999 | Geis et al. | 318/140 |
| 6,020,713 A | | 2/2000 | Geis et al. | 318/801 |
| 6,023,135 A | * | 2/2000 | Gilbreth et al. | 290/27 |
| 6,031,294 A | * | 2/2000 | Geis et al. | 290/40 R |
| 6,093,975 A | * | 7/2000 | Peticolas | 290/40 A |
| 6,133,643 A | * | 10/2000 | Lukich et al. | 290/40 A |
| 6,169,334 B1 | * | 1/2001 | Edelman | 290/46 |
| 6,202,776 B1 | * | 3/2001 | Masberg et al. | 180/65.2 |
| 6,265,786 B1 | * | 7/2001 | Bosley et al. | 290/46 |
| 6,274,945 B1 | * | 8/2001 | Gilbreth et al. | 290/47 |
| 6,281,596 B1 | * | 8/2001 | Gilbreth et al. | 123/3 |
| 6,281,601 B1 | * | 8/2001 | Edelman et al. | 290/52 |
| 6,294,842 B1 | * | 9/2001 | Skowronski | 290/7 |
| 6,325,142 B1 | * | 12/2001 | Bosley et al. | 166/53 |
| 6,355,987 B1 | * | 3/2002 | Bixel | 290/52 |
| 6,410,992 B1 | * | 6/2002 | Wall et al. | 290/52 |
| 2001/0030425 A1 | * | 10/2001 | Gilbreth et al. | 290/52 |
| 2001/0052704 A1 | * | 12/2001 | Bosley et al. | 290/52 |
| 2002/0005643 A1 | * | 1/2002 | Gilbreth et al. | 290/52 |
| 2002/0030364 A1 | * | 3/2002 | Bosley et al. | 290/7 |
| 2002/0089234 A1 | * | 7/2002 | Gilbreth et al. | 9/4 |

* cited by examiner

*Primary Examiner*—Nicholas Ponomarenko
(74) *Attorney, Agent, or Firm*—Sterne, Kessler, Goldstein & Fox, PLLC

(57) ABSTRACT

A method and system to automatically restart a permanent magnet turbogenerator/motor when a fatal fault is detected. The automatic restart logic includes time constraints and limitations on the number of iterations, and is useful regardless of whether the permanent magnet turbogenerator/motor is in a grid connect mode or a standalone mode, and regardless of how the fatal fault originates or is detected. Additional control logic is utilized to handle grid transients and over load conditions to prevent a fatal fault from occurring by using time constraints and an iterative process, together with a brake resistor to control DC bus voltage.

9 Claims, 6 Drawing Sheets

AUTOMATIC TURBOGENERATOR RESTARTING SYSTEM

This is a division of application Ser. No. 09/444,487, filed Nov. 19, 1999, now U.S. Pat. No. 6,281,596.

TECHNICAL FIELD

This invention relates to the general field of turbogenerator controls, and more particularly to an improved method and system for automatically restarting the turbogenerator under certain fault conditions.

BACKGROUND OF THE INVENTION

A turbogenerator with a shaft mounted permanent magnet motor/generator can be utilized to provide electrical power for a wide range of utility, commercial and industrial applications. While an individual permanent magnet turbogenerator may only generate 20 to 100 kilowatts, powerplants of up to 500 kilowatts or greater are possible by linking numerous permanent magnet turbogenerators together. Peak load shaving power, grid parallel power, standby power, and remote location (standalone) power are just some of the potential applications for which these lightweight, low noise, low cost, environmentally friendly, and thermally efficient units can be useful.

The conventional power control system for a turbogenerator produces constant frequency, three phase electrical power that closely approximates the electrical power produced by utility grids. Key aspects of such a power generation system are availability and reliability.

In grid-connect power generation, lack of availability can result in penalties from the local utility. Since many utility users are charged variable rates depending upon the amount of power drawn during a given period of time, the lowest $/kWh is charged when power is drawn at levels lower than some negotiated base. Power drawn above the base level will usually have greatly increased fees and sometimes a penalty associated with it. While grid-connect power generation can be used to provide less expensive power when more than the utility base level of power is required, should this grid-connect power generation fail, or otherwise be unavailable, greater costs to the user would ensue.

Availability and reliability are even more important in a standalone system in which the turbogenerator itself is providing the entire load for a user. If the turbogenerator is unavailable, lengthy interruptions to all aspects of a user's business can occur and result in significant financial loss to the user. For remote installations, the turbogenerator could be down for a lengthy period of time since it might take a while for a service person to provide support at the remote site.

SUMMARY OF THE INVENTION

The invention is directed to a method and system to automatically restart a permanent magnet turbogenerator/motor when a fatal fault is detected. The automatic restart logic includes time constraints and limitations on the number of iterations. If successful, the automatic restarting of the permanent magnet turbogenerator/motor eliminates the costly need for a complete shutdown. The automatic restart is useful regardless of whether the permanent magnet turbogenerator/motor is in a grid connect mode or a standalone mode, and regardless of how the fatal fault originates or is detected. Additional control logic is utilized to handle grid transients and over load conditions to prevent a fatal fault from occurring by using time constraints and an iterative process, together with a brake resistor to control DC bus voltage.

BRIEF DESCRIPTION OF THE DRAWINGS

Figure 1:
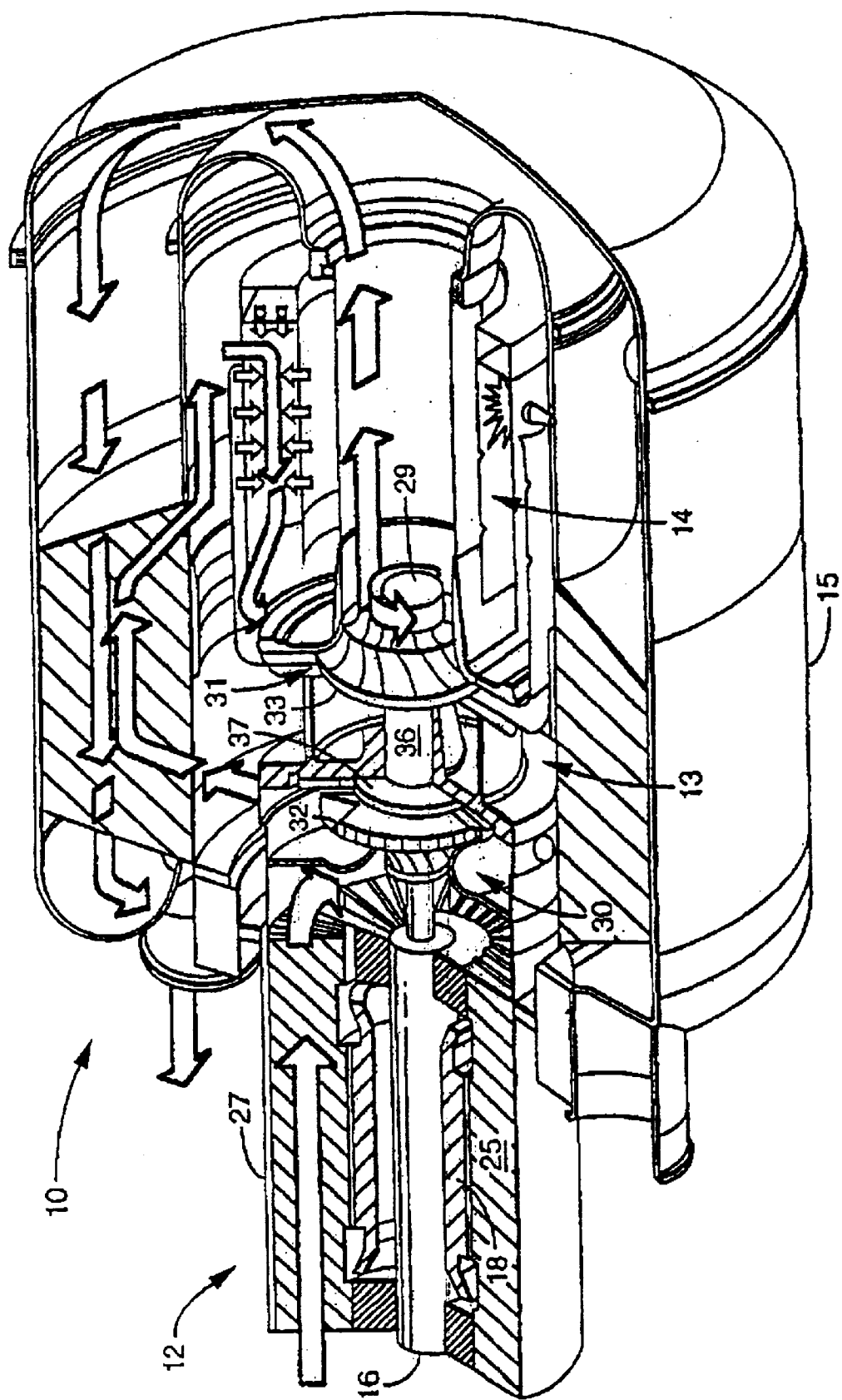
Figure 2:
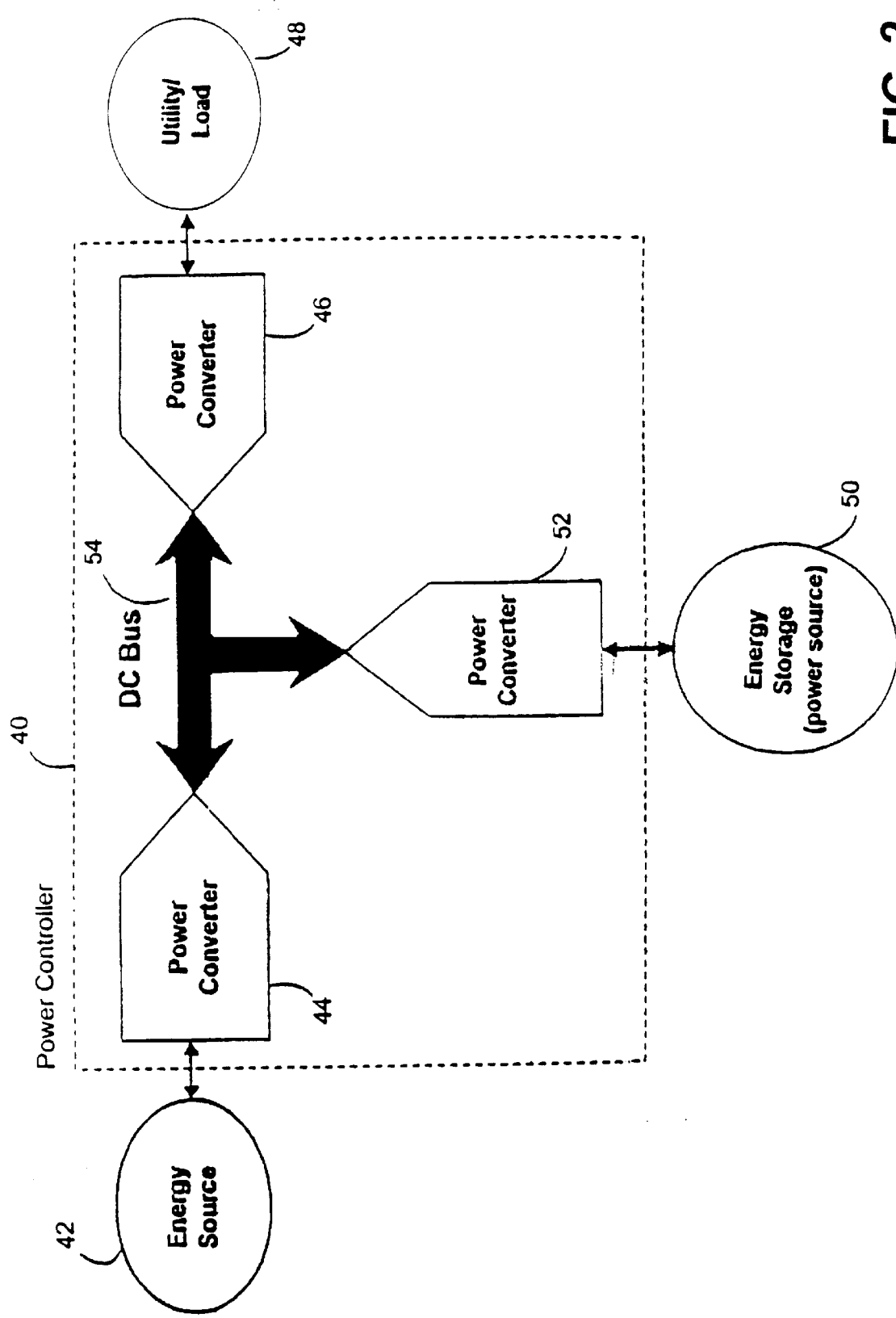
Figure 3:
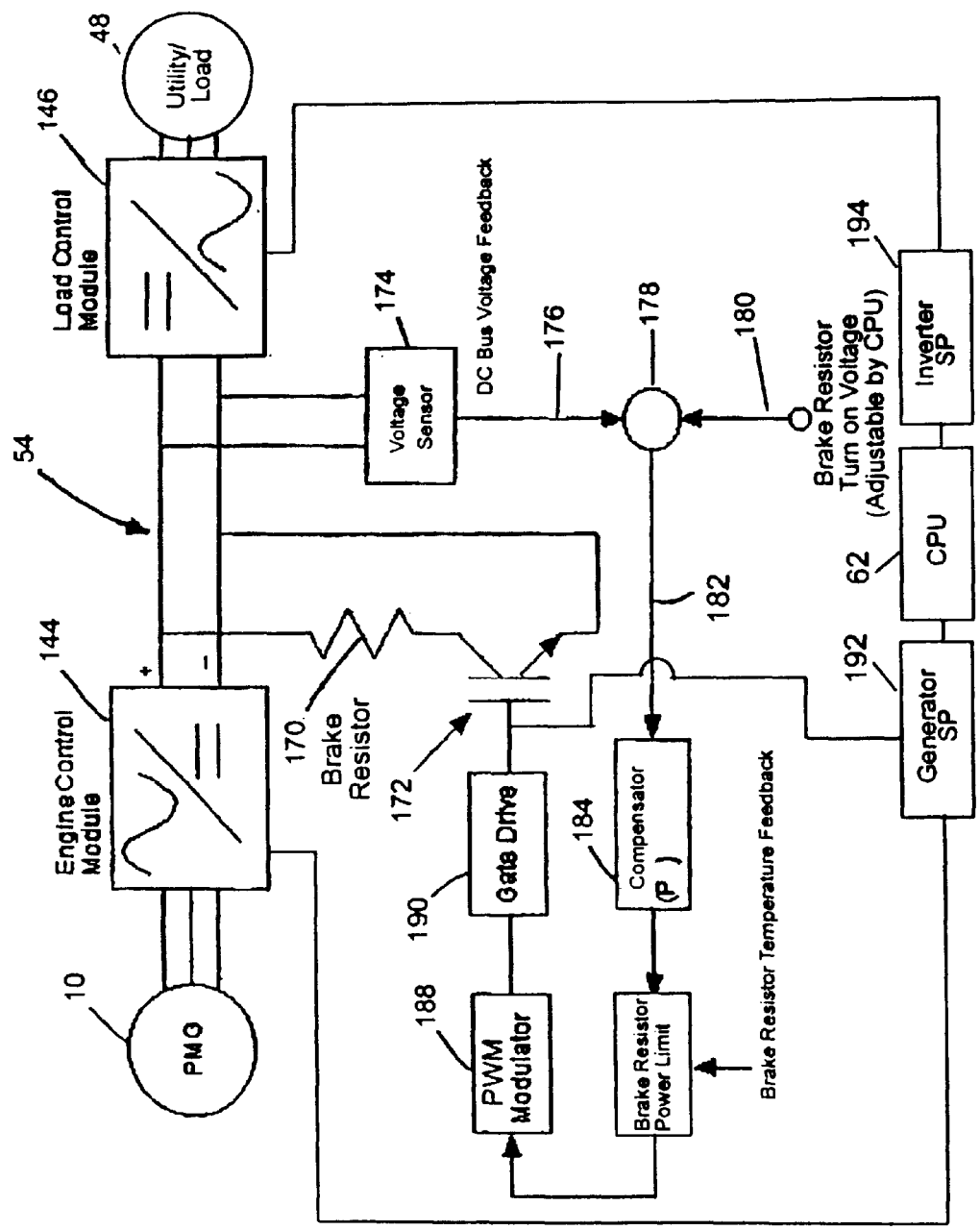
Figure 4:
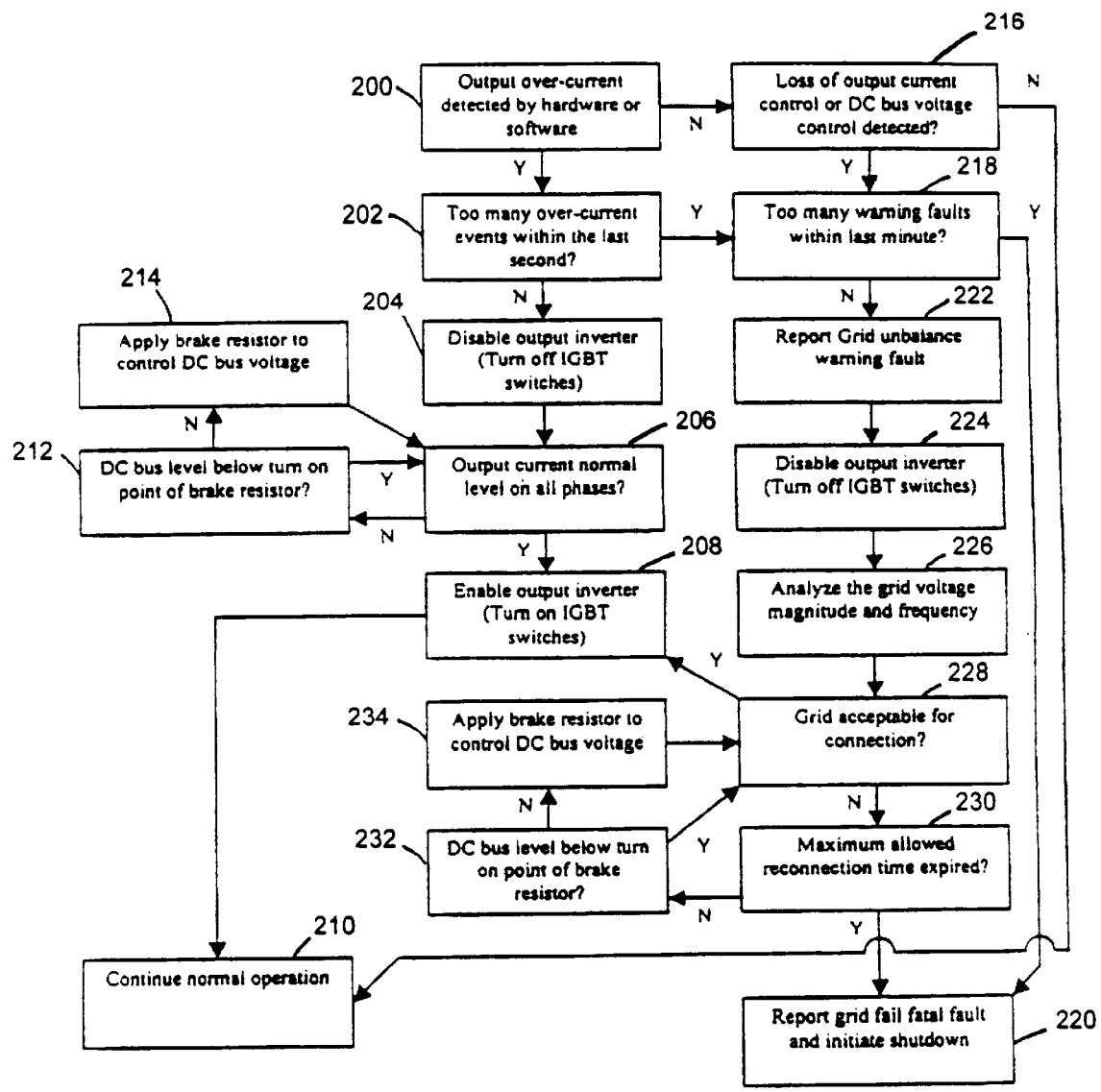
Figure 5:
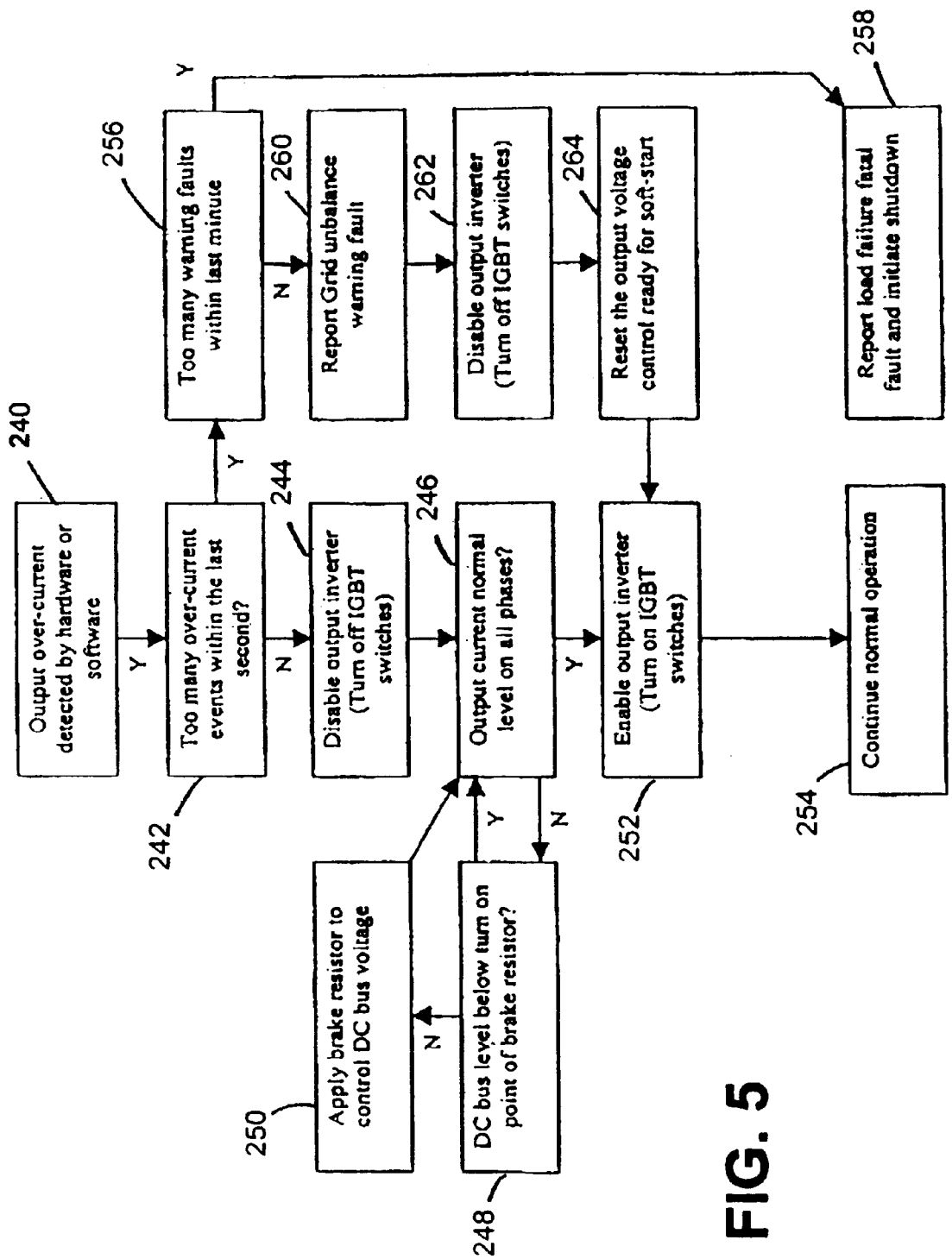
Figure 6:
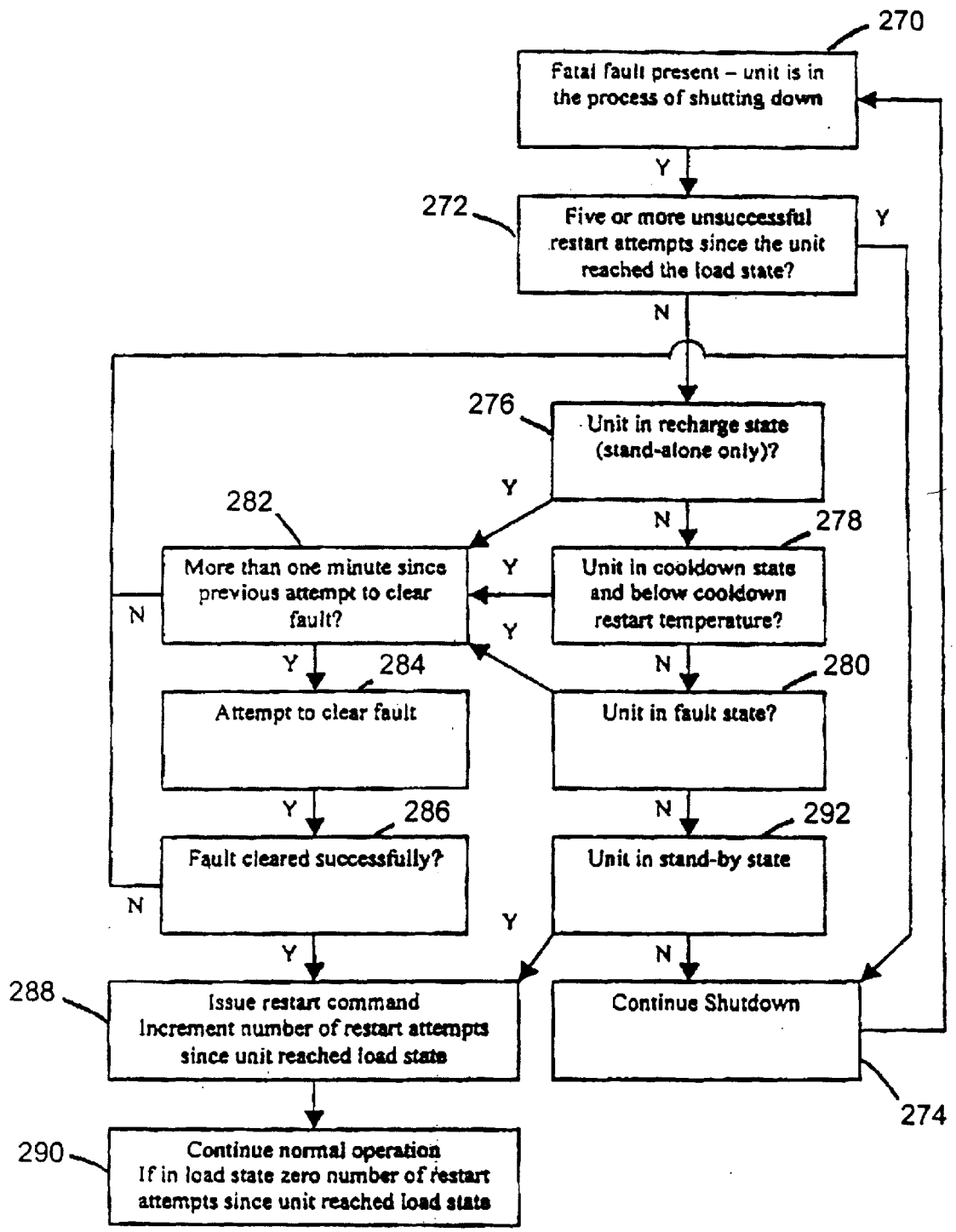

Having thus described the present invention in general terms, reference will now be made to the accompanying drawings in which:

FIG. 1 is a perspective view, partially cut away, of a turbogenerator for use in the automatic turbogenerator restarting method and system of the present invention;

FIG. 2 is a detailed block diagram of a power controller for use with the turbogenerator of FIG. 1;

FIG. 3 is a detailed block diagram of the power controller of FIG. 2 having a dynamic brake resistor;

FIG. 4 is a grid transient handling flow diagram in a grid connect mode for the automatic turbogenerator restarting method and system of the present invention;

FIG. 5 is an over load handling flow diagram in a standalone mode for the automatic turbogenerator restarting method and system of the present invention; and FIG. 6 is an auto restart flow diagram for automatically restarting the turbogenerator after a fatal fault.

DETAILED DESCRIPTION OF THE PREFERRED EMBODIMENTS

A permanent magnet turbogenerator/motor 10 is illustrated in FIG. 1 as an example of a turbogenerator/motor for use in the automatic restarting method and system of the present invention. The permanent magnet turbogenerator/motor 10 generally comprises a permanent magnet generator 12, a power head 13, a combustor 14 and a recuperator (or heat exchanger) 15.

The permanent magnet generator 12 includes a permanent magnet rotor or sleeve 16, having a permanent magnet disposed therein, rotatably supported within a permanent magnet generator stator 18 by a pair of spaced journal bearings. Radial stator cooling fins 25 are enclosed in an outer cylindrical sleeve 27 to form an annular air flow passage which cools the stator 18 and thereby preheats the air passing through on its way to the power head 13.

The power head 13 of the permanent magnet turbogenerator/motor 10 includes compressor 30, turbine 31, and bearing rotor 36 through which the tie rod 29 passes. The compressor 30, having compressor impeller or wheel 32 which receives preheated air from the annular air flow passage in cylindrical sleeve 27 around the permanent magnet generator stator 18, is driven by the turbine 31 having turbine wheel 33 which receives heated exhaust gases from the combustor 14 supplied with air from recuperator 15. The compressor wheel 32 and turbine wheel 33 are rotatably supported by bearing shaft or rotor 36 having radially extending bearing rotor thrust disk 37.

The bearing rotor 36 is rotatably supported by a single journal bearing within the center bearing housing while the bearing rotor thrust disk 37 at the compressor end of the bearing rotor 36 is rotatably supported by a bilateral thrust bearing. The bearing rotor thrust disk 37 is adjacent to the thrust face of the compressor end of the center bearing housing while a bearing thrust plate is disposed on the opposite side of the bearing rotor thrust disk 37 relative to the center housing thrust face.

Intake air is drawn through the permanent magnet generator 12 by the compressor 30 which increases the pressure of the air and forces it into the recuperator 15. In the recuperator 15, exhaust heat from the turbine 31 is used to preheat the air before it enters the combustor 14 where the preheated air is mixed with fuel and burned. The combustion gases are then expanded in the turbine 31 which drives the compressor 30 and the permanent magnet rotor 16 of the permanent magnet generator 12 which is mounted on the same shaft as the turbine wheel 33. The expanded turbine exhaust gases are then passed through the recuperator 15 before being discharged from the turbogenerator/motor 10.

The system has a steady-state turbine exhaust temperature limit, and the turbogenerator operates at this limit at most speed conditions to maximize system efficiency. This turbine exhaust temperature limit is decreased at low ambient temperatures to prevent engine surge.

Referring to FIG. 2, the power controller 40, which may be digital, provides a distributed generation power networking system in which bi-directional (i.e. reconfigurable) power converters are used with a common DC bus 54 for permitting compatibility between one or more energy components. Each power converter operates essentially as a customized bi-directional switching converter configured, under the control of power controller 40, to provide an interface for a specific energy component to DC bus 54. Power controller 40 controls the way in which each energy component, at any moment, with sink or source power, and the manner in which DC bus 54 is regulated. In this way, various energy components can be used to supply, store and/or use power in an efficient manner. The energy components include an energy source 42 such as the turbogenerator 10, utility/load 48, and storage device 50 such as a battery.

In the case of a turbogenerator 10 as the energy source 42, a conventional system regulates turbine speed to control the output or bus voltage. In the power controller 40, the bi-directional controller functions independently of turbine speed to regulate the bus voltage.

FIG. 2 generally illustrates the system topography with the DC bus 54 at the center of a star pattern network. In general, energy source 42 provides power to DC bus via power converter 44 during normal power generation mode. Similarly, during power generation, power converter 46 converts the power on DC bus 54 to the form required by utility/load 48. During utility start up, power converters 44 and 46 are controlled by the main processor to operate in different manners. For example, if energy is needed to start the turbogenerator 10, this energy may come from load/utility 48 (utility start) or from energy source 50 (battery start). During a utility start up, power converter 46 is required to apply power from load/utility 48 to DC bus for conversion by power converter 44 into the power required by the turbogenerator 10 to start up. During utility start, the turbogenerator 10 is controlled in a local feedback loop to maintain the turbine revolutions per minute (RPM). Energy storage or battery 50 is disconnected from DC bus while power converter 46 regulates $V_{DC}$ on DC bus 54 using the load/utility 48 as an energy source/sink.

Similarly, in a battery start, the power applied to DC bus 54 from which turbogenerator 10 may be started, may be provided by energy storage 50. Energy storage 50 has its own power conversion circuit in power converter 52, which limits the surge current into the DC bus 54 capacitors, and allows enough power to flow to DC bus 54 to start turbogenerator 10.

A more detailed description of the power controller can be found in U.S. patent application Ser. No. 207,817, filed Dec. 8, 1998 by Mark G. Gilbreth et al, entitled "Power Controller", assigned to the same assignee as this application and hereby incorporated by reference.

FIG. 3 illustrates a power controller of FIG. 2 having a dynamic brake resistor and associated controls. The turbogenerator 10 produces three phase AC power which is fed to AC to DC converter 144, referred to here as the engine control module. The DC voltage is supplied to DC bus 54 which is connected to DC to AC converter 146, referred to here as the load control module, which is connected to the load 48, such as the utility grid.

A brake resistor 170 is connected across the DC bus 54. Power in the DC bus can be dissipated in brake resistor 170 by modulation of switch 172. A voltage sensor 174 is also connected across the DC bus 54 to produce a DC bus voltage feedback signal 176 which is compared in comparator 178 with a brake resistor turn on voltage signal 180 to produce a DC bus error signal 182. The brake resistor turn on voltage signal 180 is adjustable by CPU 62.

The DC bus error signal 182 from comparator 178 is used to control the modulation of switch 172 after being conditioning through a proportional compensator 184, a brake resistor power limit 186 based on the measured or estimated temperature of the brake resistor 170, a pulse width modulator 188 and gate drive 190. The switch 172 may be an IGBT switch although conventional or newly developed switches can be utilized as well. The switch 172 is controlled in accordance with the magnitude of the voltage on DC bus 54. The generator signal processor 192, connected to the switch 172 and to the engine control module 144, or the inverter signal processor 192, connected to the load control module 146, typically maintains the DC bus voltage. If a rise in voltage on the DC bus is detected, the brake resistor 170 is modulated on and off until the bus voltage is restored to it desired level.

The brake resistor 170 can absorb any amount of power, from zero to greater than the full rated output of the permanent magnet turbogenerator/motor 10 for short periods of time. It is both a fast and reliable place to dissipate power and to stabilize the DC bus 54. It not only can prevent the permanent magnet turbogenerator/motor 10 from experiencing an overspeed condition, but also protects the system electronics, such as the IGBTs, from damage.

As previously mentioned, the permanent magnet turbogenerator/motor 10 can be operated in a grid parallel mode in which the permanent magnet turbogenerator/motor 10 is connected to a utility grid, or in a standalone mode in which the permanent magnet turbogenerator/motor 10 supplies all of the power to a load. Each of these modes of permanent magnet turbogenerator/motor 10 operation includes challenges in maintaining system reliability and availability.

In the grid connect mode, FIG. 4 illustrates a flow diagram for handling a grid transient. These grid transients can cause either over-currents or loss of control of the output current or DC bus voltage and these effects are monitored as a means to detect grid transients.

If an output over-current is detected, block 200, the number of over-current events within the last second is determined in block 202. If there has been too many over current events a warning or fatal fault must be reported, as determined in block 218. If there has not been too many over-current events, the output inverter 146 is disabled by turning off the IGBT switches, see block 204. If, at this point, the output current level is normal in all phases, block 206, the output inverter 146 is enabled by turning on the IGBT switches, block 208, and normal operation is continued, block 210.

If, however, the output current level is all phases, block 206, is not normal, block 212 determines if the DC bus 54 voltage level is below the turn-on point of the brake resistor 170. If the voltage level is below the brake resistor turn-on point, the brake resistor 170 is modulated on, block 214, to apply control to the DC bus voltage. The loop between blocks 206, 212, and optionally 214 (if the DC bus voltage level is above the turn on point of the brake resistor 170) continues until the output current is at a normal level on all phases.

If an output over current is not detected in block 200, block 216 serves to detect loss of output current control or DC bus voltage control. If a loss of control is not detected in block 216, normal operation is continued in block 210. If a loss of output current control or DC bus voltage control is detected in block 216, a warning or fatal fault must be reported, as determined in block 218.

If block 218 detects too many warning faults within the last minute (including too many over-current events within the last second from block 202), block 220 reports a grid fail fatal fault and shutdown is initiated. If there has not been too many warning faults in the last minute, a grid unbalance warning fault is reported in block 222 which disables the output inverter 146 by turning off the IGBT switches, see block 224. The grid voltage magnitude and frequency is analyzed, block 226 and if acceptable for connection, block 228, normal operation is continued, block 210, after the output inverter 146 is enabled, block 208.

If the grid is not acceptable for connection, block 228, and the maximum allowed reconnection time has expired, block 230, a grid fatal fault is reported and shutdown is initiated, block 220. If the maximum allowed reconnection time has not expired, block 230, and the DC bus voltage level is above the turn-on point of the brake resistor 170, block 232, the brake resistor 170 is modulated on to control DC bus output voltage, block 234. The loop between blocks 228, 230, 232, and optionally 234 (if the DC bus voltage level is above the turn on point of the brake resistor 170) continues until the grid is either acceptable for connection or the maximum allowed reconnection time has expired.

It should be recognized that in grid connect mode, grid transients are but one of the type of disturbances that can cause grid fail fatal faults and initiate shutdown. Examples of disturbances that can cause grid fail fatal faults and initiate shutdown are: voltage sags, voltage surges, voltage interruptions, single phase failures, phase to phase faults and phase to ground faults.

In the standalone mode, FIG. 5 illustrates a flow diagram for handling over load. If an output over-current is detected, block 240, the number of over-current events within the last second is determined in block 242. If there has not been too many over-current events, the output inverter 146 is disabled by turning off the IGBT switches, see block 244. If, at this point, the output current level is normal in all phases, block 246, the output inverter 146 is enabled by turning on the IGBT switches, block 252, and normal operation in continued, block 254.

If, however, the output current level in all phases, block 246, is not normal, block 248 determines if the DC bus 54 voltage level is below the turn-on point of the brake resistor 170. If the voltage level is below the brake resistor turn-on point, the brake resistor 170 is modulated on, block 250, to apply control to the DC bus voltage. The loop between blocks 246, 248, and optionally 250 (if the DC bus voltage level is above the turn on point of the brake resistor 170) continues until the output current is at a normal level on all phases.

If too many over-current events within the last second are detected in block 242, block 256 detects whether too many warning faults within the last minute have occurred. If too many warning faults within the last minute have occurred, block 256, block 258 reports a failure fatal fault and shutdown is initiated.

If there has not been too many warning faults in the last minute, a grid unbalance warning fault is reported in block 256 which disables the output inverter 146 by turning off the IGBT switches, see block 262. The output voltage control ready is reset for soft-star block 256 and normal operation is continued (block 254) after the output inverter 146 is enabled, block 252.

It should be recognized that in standalone mode, over load is but one of the types of disturbances that can cause failure fatal faults and initiate shutdown. Other examples of disturbances that can cause failure fatal faults and initiate shutdown are phase to phase faults, phase to ground faults, and connection of an out of synchronism generator to the output.

Regardless, of how the fatal fault occurs and shutdown is initiated either in grid connect mode or in standalone mode, the automatic restart flow diagram of FIG. 6 comes into play. Block 270 represents the turbogenerator in the process of shutting down with a fatal fault present. If five or more unsuccessful restart attempts have been made since the turbogenerator reached the load state, block 272, the turbogenerator will continue shutdown, block 274. The load state is the normal operating state of the turbogenerator, where power is being delivered to the grid or in standalone mode to the load. If less than five unsuccessful restart attempts were made since the turbogenerator reached load state, block 272, the turbogenerator will proceed with the attempted restart.

If the turbogenerator (standalone mode only) is in recharge state, block 276, or if the turbogenerator is in cooldown state and below cooldown restart temperature, block 278, or if the turbogenerator is in fault state, block 280, the logic proceeds to block 282 to determine if more than one minute has elapsed since the previous attempt to clear the fault. If more than one minute has elapsed since the previous attempt to clear the fault, block 284 attempts to clear the fault. If the fault is successfully cleared, block 286, a restart command is issued, block 288, and the turbogenerator can continue normal operation, block 290.

If less than a minute has elapsed since the previous attempt to clear the fault, block 282, and the fault was not cleared successfully, block 286, the shutdown will continue, block 274. If the turbogenerator is not in fault state, block 280, but rather in standby state, block 292, the restart command can be issued, block 288 and normal operation continued, block 290. If the turbogenerator is not in standby, block 292, the shutdown will continue, block 274.

The transient control logic of FIGS. 5 and 6 exists in the inverter signal processor 194 except for the brake resistor controls which exist in the generator signal processor 192. The automatic restart logic of FIG. 6 exists in the main CPU 62.

The above method and system greatly increase the availability of the permanent magnet turbogenerator/motor 10 during load transients and other fault conditions. By temporarily disconnecting the permanent magnet turbogenerator/motor 10 from the grid during large grid transients of short duration with power absorbed in the brake resistor 170, the grid can be quickly reengaged without a lengthy shutdown.

Unrecoverable grid/load faults will, however, require the shutdown process to commence. The automatic restart logic will allow the system to reset appropriate fault conditions and commence a restart on its own. For safety reasons, the number of retries is limited and delay timers permit a period of time to lapse between tries.

While specific embodiments of the invention have been illustrated and described, it is to be understood that these are provided by way of example only and that the invention is not to be construed as being limited thereto but only by the proper scope of the following claims.

What we claim is:

1. A permanent magnet turbogenerator/motor restarting system, comprising:
    means for determining that the permanent magnet turbogenerator/motor has a fatal fault present and is in the process of shutting down;
    means for determining that the permanent magnet turbogenerator/motor has more than a fixed number of restart attempts since the permanent magnet turbogenerator/motor was determined to have a fatal fault; and
    means for continuing shutdown of the permanent magnet turbogenerator/motor.

2. A permanent magnet turbogenerator/motor restarting system, comprising:
    means for determining that the permanent magnet turbogenerator/motor has a fatal fault present and is in the process of shutting down;
    means for determining that the permanent magnet turbogenerator/motor has less than a fixed number of restart attempts since the permanent magnet turbogenerator/motor was determined to have a fatal fault;
    means for determining that the permanent magnet turbogenerator/motor is in a recharge state where an internal energy storage device is being recharged as part of the shutdown process;
    means for determining that a fixed period of time has elapsed since any previous attempt to restart the permanent magnet turbogenerator/motor;
    means for attempting to clear the fault present in the permanent magnet turbogenerator/motor;
    means for issuing a restart command to the permanent magnet turbo generator/motor if the fatal fault is successfully cleared; and
    means for continuing normal operation of the permanent magnet turbogenerator/motor.

3. A permanent magnet turbogenerator/motor restarting system, comprising:
    means for determining that the permanent magnet turbogenerator/motor has a fatal fault present and is in the process of shutting down;
    means for determining that the permanent magnet turbogenerator/motor has less than a fixed number of restart attempts since the permanent magnet turbogenerator/motor was determined to have a fatal fault;
    means for determining that the permanent magnet turbogenerator/motor is in a cooldown state where the turbogenerator/motor is being rotated when combustion has ceased to lower the internal temperature as part of the shutdown process and that the internal temperature is below a cooldown restart temperature;
    means for determining that a fixed period of time has elapsed since any previous attempt to restart the permanent magnet turbogenerator/motor;
    means for attempting to clear the fault present in the permanent magnet turbogenerator/motor;
    means for issuing a restart command to the permanent magnet turbogenerator/motor if the fatal fault is successfully cleared; and
    means for continuing normal operation of the permanent magnet turbogenerator/motor.

4. A permanent magnet turbogenerator/motor restarting system, comprising:
    means for determining that the permanent magnet turbogenerator/motor has a fatal fault present and is in the process of shutting down;
    means for determining that the permanent magnet turbogenerator/motor has less than a fixed number of restart attempts since the permanent magnet turbogenerator/motor was determined to have a fatal fault;
    means for determining that the permanent magnet turbogenerator/motor is in a fault state;
    means for determining that a fixed period of time has elapsed since any previous attempt to restart the permanent magnet turbogenerator/motor;
    means for attempting to clear the fault present in the permanent magnet turbogenerator/motor;
    means for issuing a restart command to the permanent magnet turbogenerator/motor if the fatal fault is successfully cleared; and
    means for continuing normal operation of the permanent magnet turbogenerator/motor.

5. A permanent magnet turbogenerator/motor restarting system, comprising:
    means for determining that the permanent magnet turbogenerator/motor has a fatal fault present and is in the process of shutting down;
    means for determining that the permanent magnet: turbogenerator/motor has less than a fixed number of restart attempts since the permanent magnet turbogenerator/motor was determined to have a fatal fault;
    means for determining that the permanent magnet turbogenerator/motor is in a standby state;
    means for issuing a restart command to the permanent magnet turbogenerator/motor; and
    means for continuing normal operation of the permanent magnet turbogenerator/motor.

6. A permanent magnet turbogenerator/motor restarting system, comprising:
    means for determining that the permanent magnet turbogenerator/motor has a fatal fault present and is in the process of shutting down;
    means for determining that the permanent magnet turbogenerator/motor has less than a fixed number of restart attempts since the permanent magnet turbogenerator/motor was determined to have a fatal fault;
    means for determining that the permanent magnet turbogenerator/motor is in a recharge state where an internal energy storage device is being recharged as part of the shutdown process;

means for determining that a fixed period of time has not elapsed since any previous attempt to restart the permanent magnet turbogenerator/motor; and means for continuing shutdown of the permanent magnet turbogenerator/motor.

7. A permanent magnet turbogenerator/motor restarting system, comprising:

means for determining that the permanent magnet turbogenerator/motor has a fatal fault present and is in the process of shutting down;

means for determining that the permanent magnet turbo generator/motor has less than a fixed number of restart attempts since the permanent magnet turbogenerator/motor was determined to have a fatal fault;

means for determining that the permanent magnet turbogenerator/motor is in a cooldown state where the turbogenerator/motor is being rotated when combustion has ceased to lower the internal temperature as part of the shutdown process and that the internal temperature is below a cooldown restart temperature;

means for determining that a fixed period of time has elapsed since any previous attempt to restart the permanent magnet turbogenerator/motor;

means for attempting to clear the fault present in the permanent magnet turbogenerator/motor; and means for continuing shutdown of the permanent magnet turbogenerator/motor when the fault is not cleared.

8. A permanent magnet turbogenerator/motor restarting system, comprising:

means for determining that the permanent magnet turbogenerator/motor has a fatal fault present and is in the process of shutting down;

means for determining that the permanent magnet turbogenerator/motor has a less than a fixed number of restart attempts since the permanent magnet turbogenerator/motor was determined to have a fatal fault;

means for determining that the permanent magnet turbo generator/motor is in a fault state;

means for determining that a fixed period of time has elapsed since any previous attempt to restart the permanent magnet turbogenerator/motor;

means for attempting to clear the fault present in the permanent magnet turbogenerator/motor; and means for continuing shutdown of the permanent magnet turbogenerator/motor when the fault is not cleared.

9. The permanent magnet turbogenerator/motor restarting system of claim 8 wherein said means for determining that the permanent magnet turbogenerator/motor has a fatal fault present and is in the process of shutting down, comprises:

means for detecting no output over-current;

means for detecting a loss of output current control or a loss of DC bus voltage control;

means for determining that less than a fixed number of warning faults has occurred within a fixed period of time;

means for reporting a grid unbalance warning fault;

means for disabling the output power converter of the permanent magnet turbogenerator/motor;

means for analyzing the grid voltage magnitude and frequency for an unacceptable connection;

means for determining that the maximum allowable reconnection time has not expired;

means for determining that the DC bus level is not below the turn on point of the brake resistor, means for applying the brake resistor to control DC bus voltage;

means for determining that the grid is acceptable for connection; and means for enabling the output power converter of the permanent magnet turbogenerator/motor to continue normal operation of the permanent magnet turbogenerator/motor.

* * * * *